United States Patent
Radha et al.

(10) Patent No.: US 11,447,151 B2
(45) Date of Patent: Sep. 20, 2022

(54) OBJECT DETECTION UNDER RAINY CONDITIONS FOR AUTONOMOUS SYSTEMS

(71) Applicants: Board of Trustees of Michigan State University, East Lansing, MI (US); Ford Global Technologies, LLC, Dearborn, MI (US)

(72) Inventors: Hayder Radha, East Lansing, MI (US); Mazin Hnewa, East Lansing, MI (US); Jon Diedrich, Carleton, MI (US); Mark Gehrke, Ypsilanti, MI (US)

(73) Assignees: Board of Trustees of Michigan State University, East Lansing, MI (US); Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/419,762

(22) PCT Filed: Jan. 9, 2020

(86) PCT No.: PCT/US2020/012920
§ 371 (c)(1),
(2) Date: Jun. 30, 2021

(87) PCT Pub. No.: WO2020/146622
PCT Pub. Date: Jul. 16, 2020

(65) Prior Publication Data
US 2022/0041185 A1 Feb. 10, 2022

Related U.S. Application Data

(60) Provisional application No. 62/790,168, filed on Jan. 9, 2019.

(51) Int. Cl.
*B60W 60/00* (2020.01)
*G06V 20/58* (2022.01)
(Continued)

(52) U.S. Cl.
CPC ....... *B60W 60/0015* (2020.02); *G06K 9/6256* (2013.01); *G06N 3/02* (2013.01); *G06V 20/58* (2022.01); *B60W 2420/42* (2013.01)

(58) Field of Classification Search
None
See application file for complete search history.

(56) References Cited

U.S. PATENT DOCUMENTS

| 9,465,987 B1 | 10/2016 | Bell et al. |
| 2006/0228001 A1 | 10/2006 | Tsukamoto |

(Continued)

FOREIGN PATENT DOCUMENTS

EP 2 293 588 A1 3/2011

*Primary Examiner* — Adam D Tissot
*Assistant Examiner* — Garrett F Evans
(74) *Attorney, Agent, or Firm* — Harness, Dickey & Pierce, PLC

(57) ABSTRACT

Advanced automotive active-safety systems, in general, and autonomous vehicles, in particular, rely heavily on visual data to classify and localize objects, most notably pedestrians and other nearby cars, to assist the corresponding vehicles maneuver safely in their environment. However, the performance of object detection methods is anticipated to degrade under challenging rainy conditions. Nevertheless, and despite major advancements in the development of deraining approaches, the impact of rain on object detection has largely been understudied, especially in the context of autonomous systems. This disclosure analyzes this problem space and presents an improved system for detecting objects under rainy conditions.

10 Claims, 6 Drawing Sheets

(51) Int. Cl.
  *G06K 9/62*   (2022.01)
  *G06N 3/02*   (2006.01)

(56) References Cited

U.S. PATENT DOCUMENTS

| | | |
|---|---|---|
| 2010/0023223 A1 | 1/2010 | Huang et al. |
| 2016/0148383 A1* | 5/2016 | Cerqueira ............... G06F 16/50 |
| | | 382/194 |
| 2018/0099646 A1* | 4/2018 | Karandikar ........... B60W 40/02 |
| 2018/0290592 A1 | 10/2018 | Stein et al. |
| 2019/0188524 A1* | 6/2019 | He ....................... G06K 9/6255 |
| 2019/0213451 A1* | 7/2019 | Schäfer ................. G06V 10/10 |

\* cited by examiner

RI=0.1

RI=0.3

RI=0.5

RI=0.7

RI=1

OBJECT DETECTION UNDER RAINY CONDITIONS FOR AUTONOMOUS SYSTEMS

CROSS-REFERENCE TO RELATED APPLICATIONS

This application is a National Phase entry of PCT International Application No. PCT/US2020/012920, filed on Jan. 9, 2020, which claims priority to U.S. Provisional Patent Application Ser. No. 62/790,168, filed Jan. 9, 2019. The entire disclosure of the above applications are incorporated by reference herein.

FIELD

The present disclosure relates to an object detection under rainy conditions for autonomous systems.

BACKGROUND

Visual data plays a critical role in enabling automotive active safety systems and autonomous vehicles achieve high levels of safety while maneuvering in their environments. For example, emerging autonomous vehicles are anticipated to employ cameras and deep learning based methods for object detection and classification. In particular, high precision, pedestrian detection represents a fundamental requirement for any viable autonomous vehicle system. Meanwhile, Convolutional Neural Network (CNN) based approaches have shown very promising results in the detection of pedestrians and other objects. These neural networks are usually trained using a large amount of visual data captured under favorable clear conditions. However, the performance of such systems under challenging weather, such as rainy conditions has not been thoroughly studied (or at least documented) to the best of our knowledge.

Meanwhile, there has been significant progress in the development of advanced visual deraining algorithms, which have been increasingly attracting a great deal of attention. Thus, one natural and intuitive solution for mitigating the effect of rain on active safety and autonomous systems is to employ robust deraining algorithms and then apply the desired object detection approach on the resulting derained signal. The deraining algorithms, however, are designed to remove the visual impairments caused by rain while preserving the original signal with minimal distortion. Hence, the primary objective of these algorithms, in general, is to preserve the visual quality as measured by popular performance metrics, such as Peak-Signal-to-Noise-Ratio (PSNR) and structure similarity index (SSIM). These metrics, however, do not reflect a viable measure for analyzing the performance of the system for more complex tasks such as object detection, which is the primary objective of active safety and autonomous vehicle systems.

Therefore, it is desirable to provide an improved system for detecting objects under rainy conditions. This section provides background information related to the present disclosure which is not necessarily prior art.

SUMMARY

This section provides a general summary of the disclosure, and is not a comprehensive disclosure of its full scope or all of its features.

A system is presented for detecting objects in a scene under rainy weather conditions. The system includes: a camera, a rain sensor, a selector and two or more object classifiers. Each object classifier is configured to receive the image data from the camera and operates to classify objects contained in the image data. Each object classifier is trained using data with different levels of rain intensity therein. The selector is interfaced with rain sensor and each of the object classifiers. The selector activates one of the two or more object classifiers to receive the image data from the camera based on input from the rain sensor such that the object classifier activated by the selector corresponds to level of rain intensity measured by the rain sensor.

In some embodiments, the object classifiers are implemented using deep neural networks, such as a convolutional neural network, and more particularly can be implemented using the you only look once (YOLO) algorithm.

In another aspect, the system is configured to detect objects in a scene under different weather conditions. In this case, a sensor is configured to detect an attribute of ambient weather and the selector activates one of the two or more object classifiers to receive the image data from the imaging device based on input from the sensor. Different types of sensors may be used to detect and/or measure different types of weather conditions, including but not limited to sleet, snow, or sand storms.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
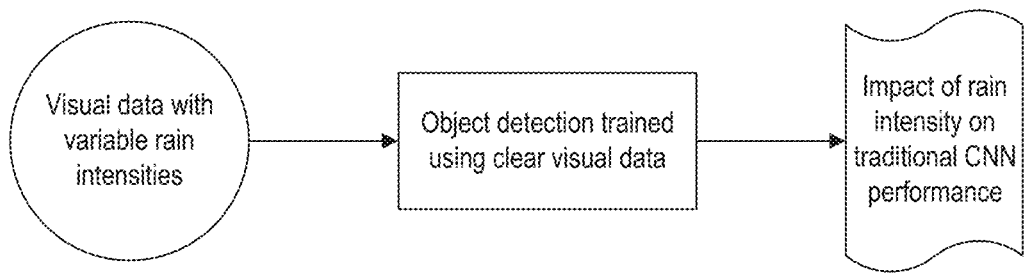
FIGS. 1A-1C illustrate three architectures highlighting the main contributions of this disclosure.
Figure 1B:
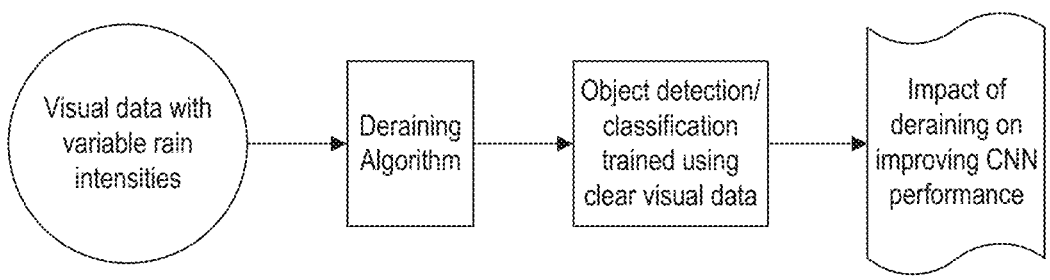
Figure 1C:
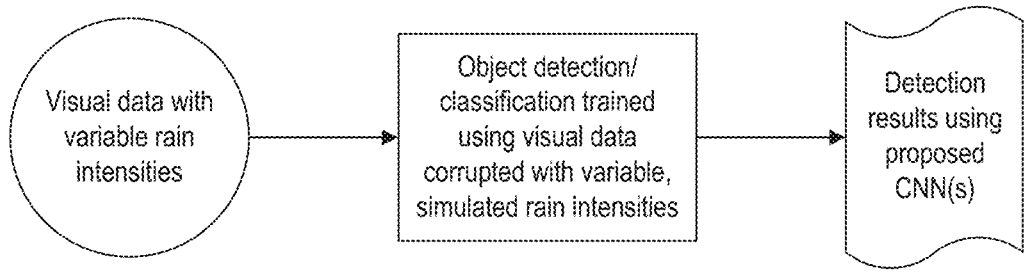
Figure 2A:
FIGS. 2A-2E are images with different levels of rain intensity.
Figure 2B:
Figure 2C:
Figure 2D:
Figure 2E:

FIGS. 1A-1C illustrate three architectures highlighting the main contributions of this disclosure. FIG. 1A depicts a systematic approach for analyzing the impact of rain intensity on popular deep learning based object detection. FIG. 1B depicts the use of deraining algorithms to mitigate the impact of rain in the context of object detection. FIG. 1C depicts an approach for mitigating impact of rain by training object classifiers using data corrupted with variable rain intensities. Each of these contributions is further described below.

Most object detection algorithms depend on visual signals to achieve their task in support of a broad range of applications. This is especially the case for automotive active safety systems and autonomous vehicles that rely heavily on a variety of cameras for the detection of pedestrians, vehicles and other objects. However, challenging weather conditions such as rain adversely affect the visual quality of signals captured by cameras. This should naturally lead to degradation in the performance of the detection algorithms. As a starting point, this disclosure presents the results of a study that focuses on quantifying the impact of rain on the performance of object detection. To that end, an object detection framework that is both popular and representative of deep learning based approaches, were selected. Second, a viable visual data set with known ground truth of objects, most importantly pedestrians and vehicles, was selected. Third, a rain simulation framework was employed that could provide one with the control and flexibility in conducting a comprehensive set of experiments in conjunction with known rain intensities.

To comprehensively study the influence of rain on object detection, You Only Look Once (YOLO) was selected as the object detection framework due to its popularity as a benchmark real-time object detection framework that is commonly used for comparison against emerging and new detection methods. One of the important aspects of YOLO that makes it appealing for real-time object detection, and which is highly critical for active safety and autonomous systems, is its low complexity. For example, on most readily available computational platforms, it can process more than 40 frames per second. YOLO employs a deep learning framework, where it applies one deep neural network to the whole image directly instead of processing a large number of small patches of the input image. It predicts bounding boxes surrounding objects as well as class probabilities associated with each bounding box. While reference is made throughout this disclosure to YOLO, the concepts presented herein are applicable to other types of object detection algorithms, including but not limited to Faster R-CNN and its variants, Spatial Pyramid Pooling (SPP-net), and Single Short Detector (SSD).

To train and test YOLO, the Udacity annotated data set captured through the well-known self-driving car project was used. The dataset has about 22,281 sequence frames of visual scenes based on autonomous driving in Mountain View Calif. and neighboring cities during daylight conditions. The frames were captured by Point Grey research cameras running at the full resolution of 1920×1200. Two classes are considered: vehicles and pedestrians are labeled and provided as ground truth objects within the Udacity dataset. Naturally, these two classes are among the most critical objects for an autonomous vehicle. Resolution of frames is reduced to 640×400 in order to make them compatible with the YOLO framework, and to avoid "out of memory" issues that one frequently encounters when using the full resolution visuals. In this disclosure, most of the Udacity frames are used to train YOLO. The remaining sequence frames that are not used in the training process are used for testing purposes. The selected test frames have 6976 annotated objects: 5519 of them are vehicles, and the remaining 1457 are pedestrians.

To explore the impact of rain thoroughly, different intensities of synthetic rain are simulated. For demonstration purposes, Cycore Rainfall simulation that run under Adobe After Effect software is used to synthesize rain streaks on test frames. FIGS. 2A-2E show a sample frame after simulating various levels of synthetic rain intensity (RI). Increase the rain intensity via increasing the amount of raindrops in the scene. Ten discrete levels of rain intensities corresponding to a normalized range of 0.1 to 1.0 are used. These intensities represent numbers of raindrops/rain-streaks ranging from 10,000 to 100,000 corrupting the underlying visuals. Based on extensive experience with different levels of rain intensities, these discrete levels provided the most viable range in terms of impacting the test dataset in a meaningful manner. After generating the different visuals corresponding to the different levels of rain intensities, trained YOLO was applied to the synthetic rainy frames as well as the original clear frames. The predicted detection (i.e. class of predicted object and coordinates of bounding box) was recorded to measure the performance as compared to the ground-truth detection.

To evaluate the performance of detection, compute the mean Average Precision (mAP). This metric has arguably been the most popular performance measure since the time when it was originally defined in the PASCAL Visual Object Classes Challenge 2012 for evaluating detection methods. To determine mAP, precision/recall curve is firstly computed based on prediction result against ground truth. A prediction is considered a truth positive if its bounding box has Intersection over Union (IoU) greater than 0.5 with the corresponding ground truth bounding box, and it should have the same class label with the ground truth. Then, the curve is updated by making precision monotonically decreasing. This is achieved by setting the precision for recall r to the maximum precision obtained for any recall r'>r. Average Precision (AP) will be the area under the updated precision/recall curve. It is computed by numerical integration. Finally, mAP is the mean of AP across all classes.

Figure 3A:
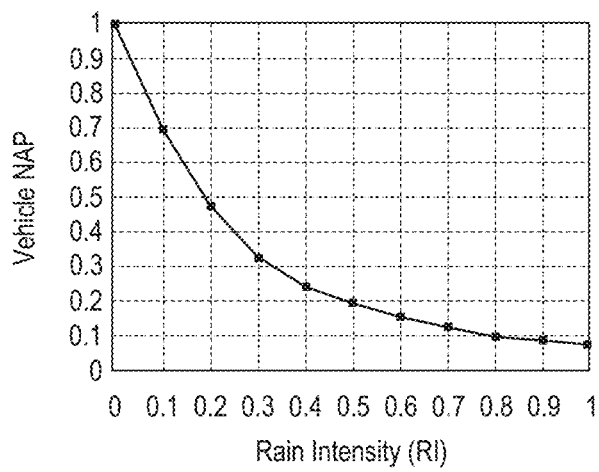
FIGS. 3A-3C are graphs plotting normalized average precision (NAP) for vehicle class, pedestrian class, and the normalized mean average precision (NmAP), respectively.
Figure 3B:
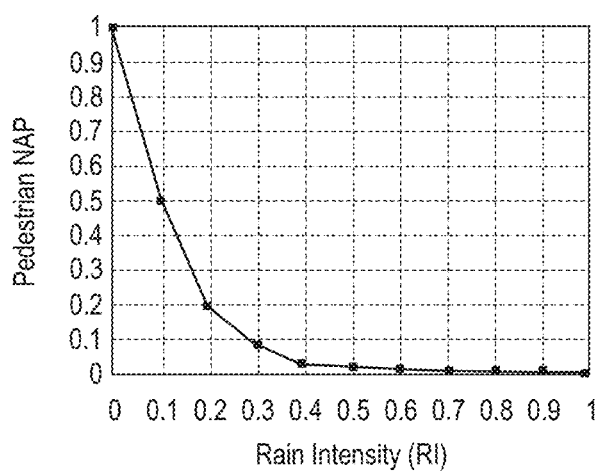
Figure 3C:
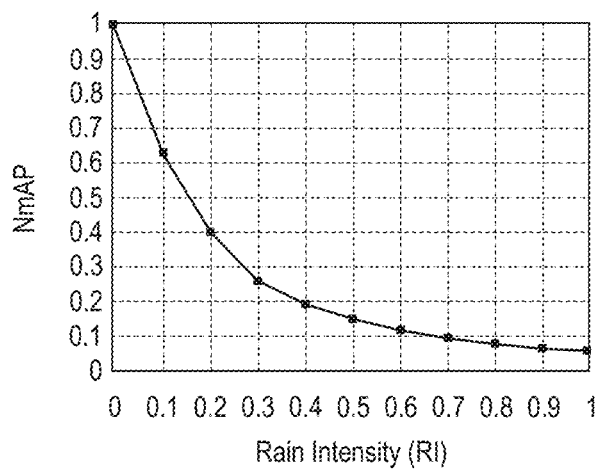

In this disclosure, mAP is computed for various rain intensities in the test frames, for example using the Cartucho/mAP software package. To clearly illustrate the impact of rain, the computed mAP is normalized by its maximum value, which takes place under clear conditions (i.e. RI=0). FIGS. 3A-3C show plots of normalized average precision (NAP) for the classes vehicle and pedestrian as well as the Normalized mAP (NmAP) evaluated based on the NAP values of both classes. From the figures, observe that the normalized average precision clearly decreases as rain intensity increases. Consequently, these results clearly illustrate that the performance of an object detection framework, which is trained using clear visuals, could significantly degrade under rainy weather conditions. As rain intensity increases, the performance could decrease due to the observation that rain corrupts fundamental details of the underlying visuals, which inherently help detection methods to classify and localize objects. As a result, rain distorts the desired visual details that are required for reliable detection, and hence it significantly impacts detection methods negatively. Moreover, as rain intensity increases, normalized average precision for pedestrian declines more rapidly than normalized average precision for vehicle. The reason for that is that pedestrians are smaller objects than vehicles in the same scene, and it becomes increasingly challenging for an object detection method to detect pedestrians in rainy weather.

Figure 4:
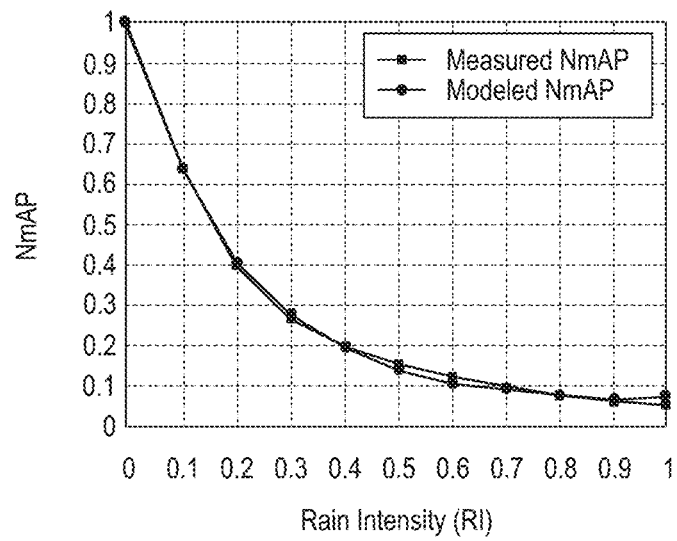
FIG. 4 is a graph comparing modeled NmAP to measured NmAP.

With reference to FIG. 3C, NmAP degrades exponentially as a function of rain intensity. One can simply model this relationship using: $\mu=\mu_0 \exp(-\beta R)$, where $\mu$ represents the NmAP, R is rain intensity, and $\mu_0$ is the NmAP value under clear conditions (zero rain intensity), which in this case $\mu_0=1$. However, after exploring various models, one concludes that a better representative model for the impact of rain intensity on NmAP is the following:

$$\mu=\alpha \exp(-\beta R)+c \qquad (1)$$

where $\alpha$, $\beta$, and c are hyperparameters that are used to tune the model. For the results shown here, and after extensive tuning, one finds that the values of the hyperparameters that minimize the Mean-Square-Error (MSE) to be: $\alpha=0.9445$, $\beta=4.875$, $c=0.0567$. The resulted MSE is very small ($6.31\times 10^{-5}$). Note that for this model, the performance under clear conditions is: $\mu_0=\alpha+c$. FIG. 4 compares the modeled NmAP with the actual measured NmAP values. Despite the potential limitation of this model as a representative of the particular results shown here (e.g., pertaining to YOLO), the proposed model does capture the actual measured values quite accurately over the wide range of normalized rain intensities. Such modeling proves both an insightful analytical function, and an efficient mechanism for evaluating the impact of rain intensity on object detection, which could save tremendous amount of effort for conducting tedious experiments and simulations.

To explore the utility of deraining in improving the performance of object detection, three recently developed deraining algorithms were employed. After applying the three deraining algorithms, apply the detection method (YOLO) on the resulting derained frames and compute the performance metric (NmAP). Below, these three deraining methods and the results for employing them in conjunction with object detection are outlined.

First, a tensor-based video rain streaks removal approach is presented as described by Jiang et at. in "A Novel Tensor-Based Video Rain Streaks Removal Approach via Utilizing Discriminatively Intrinsic Priors" 2017 IEEE Conference on Computer Vision and Pattern Recognition (CVPR), 2017. This approach considered the discriminatively intrinsic characteristics of rain streaks and clean video. Basically, a rain video is separated into rain streaks and clean video by imposing priors which are sparsity of rain streaks, low-rankness of background, and total variation of rain and background in different directions.

Figure 5:
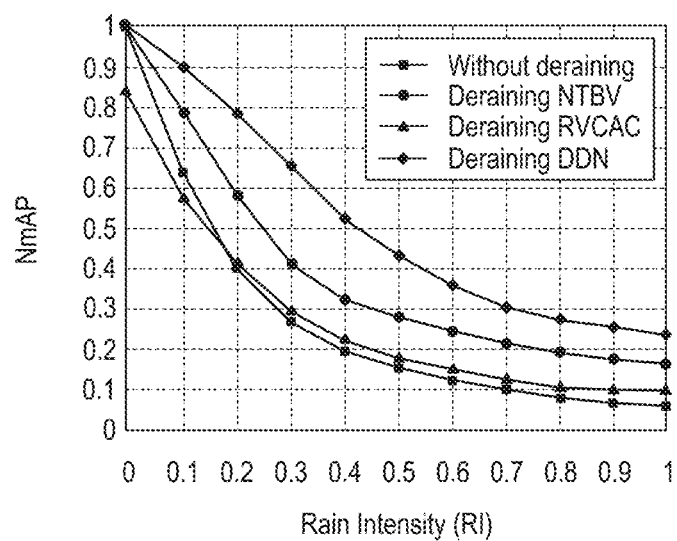
FIG. 5 is a graph showing NmAP for different rain intensities with and without deraining. In addition to the baseline curve (without any deraining), the NmAP values are shown when using the deraining methods: NTBV, RVCAC, and DDN.

FIG. 5 shows the performance of employing the Novel Tensor-Based Video (NTBV) approach to remove rain from visuals. This approach provides marginal improvement as shown in the figure (line with circles). Furthermore, this method requires huge memory. In particular, it needs about 60 GB to process 1156 test frames with resolution of 640×400. Moreover, it consumes about one hour to handle the test frames (i.e. approximately 3 second per frame). Extreme memory requirement and slow execution time naturally makes this approach not appropriate for time-critical tasks needed by autonomous vehicles.

Next, a robust video content alignment and compensation approach is presented by Chen et at. in "Robust Video Content Alignment and Compensation for Rain Removal in a CNN Framework", 2018 IEEE Conference on Computer Vision and Pattern Recognition (CVPR). The approach includes a video-based rain removal algorithm based on robust SuperPixel (SP) alignment between video frames followed by details compensation in a CNN framework. A scene is decomposed into depth consistent units by utilizing SP segmentation. Then, scene contents are aligned at the SP level which leads to generation of an intermediate derained output. After that, a convolution neural network (CNN) is used to compensate the miss-alignment blur.

FIG. 5 also shows the performance of employing Robust Video Content Alignment and Compensation (RVCAC). Overall, the figure shows a very slight improvement in terms of NmAP (line with triangles); and in fact, the performance could degrade for low rain intensity levels when compared with not applying this deraining approach. The memory requirement for this method is moderate (about 2 GB) to process the test frames in our work. Nevertheless, it also consumes about one hour to derain the test frames (i.e. approximately 3 second per frame).

Lastly, removing rain from single images is proposed by Fu et at. in "Removing Rain from Single Images via a Deep Detail Network", 2017 IEEE Conference on Computer Vision and Pattern Recognition (DVOR), 2017. A convolutional neural network (CNN) framework is used to remove rain streaks from single images. This approach employed CNN to predict the difference between clear and rainy images, and used this difference to remove rain from rainy image. Moreover, they exploit only the high frequency details of the rainy image as input to CNN, and ignore the low frequency background interference of the image.

FIG. 5 shows the performance of removing rain from single images via a Deep Detail Network (DDN). It can be shown here that the DDN approach provides a tangible improvement in terms of NmAP (line with diamonds) as compared to previous deraining methods. Furthermore, since DDN processes each frame individually, it does not demand heavy memory usage. Moreover, it consumes less time than previous video based. Actually, it needs about 40 minutes to handle the test frames (i.e. approximately 2 second per frame) if one uses a CPU implementation, and about 10 minutes (i.e. 0.45 second per frame) if one uses a GPU implementation.

It is worth noting that RVCAC and NTBV are video-based deraining methods that depend heavily on high temporal correlation of adjacent frames to remove rain streaks. Although they might be adequate for certain applications with stationary cameras and relatively low levels of motions in the scene, this disclosure shows that they cannot handle dynamic scenes with moving cameras and objects, which is the case for autonomous driving. With continued reference to FIG. 5, which summarizes the results of the approaches discussed above, both RVCAC and NTBV provide an inadequate improvement to object detection. Additionally, they currently operate far from what is required by a real-time system due to their high computational complexity. NTBV achieves better performance than RVCAC. However, it requires larger memory usage.

On the other hand, the image based deraining method (DDN) outperforms the other video-based deraining methods (RVCAC and NTBV). The performance is still insufficient because these methods distort important details in frames when they remove rain streaks. These details substantially assist detection algorithms to classify and localize objects. Hence, and overall, it is believed that relying purely on state-of-the-art deraining method does not represent a viable approach for mitigating the impact of rain on object detection.

Most detection algorithms, including YOLO, are trained using images that are captured under favorable and clear weather conditions are expected to work reliably under different weather conditions (e.g. in the rain). This is at odds with the fact that the training data is usually collected in dry weather with good visibility. Thus, performance of object detection algorithms decline in challenging weather conditions as shown above, even when attempting to mitigate the impact of rain through deraining.

To address this problem, this disclosure proposes to train a given CNN for the detection of objects using synthetic rain frames with a wide range of rain intensities (RI). It is important to highlight that a variety of viable CNN architectures could be used for the proposed framework. However, for the sake of constancy with the results of the study presented above, this disclosure employs the same architecture used by YOLO but with different sets of training sequences based on synthetic rain with various intensity levels. Hence, the overall framework presented here is referred to as Rain Trained YOLO (RT-YOLO). To that end, a crucial finding of this study is the following: the particular CNN used should adapt to the level of rain intensity in order to achieve the best possible object detection performance based on the normalized mean Average Precision (NmAP) metric. Conceptually, this adaptation could be handled in different ways.

Figure 6:
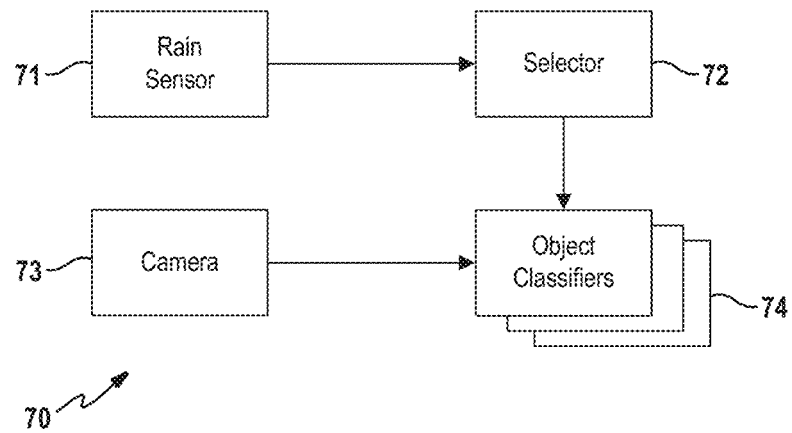
FIG. 6 is a diagram of an example embodiment for a system that detects objects under rainy conditions.

FIG. 6 illustrates one example embodiment for a system 70 that detects objects in a scene under rainy weather conditions. The system 70 is comprised of a camera 73, a rain sensor 71, a selector 72 and two or more object classifiers 74. The camera 73 is configured to capture image data of a scene. Other types of imaging device are contemplated by this disclosure.

Each object classifier 74 is configured to receive the image data from the camera 73 and operates to classify objects contained in the image data. More importantly, each object classifier 74 is trained using data with different levels of rain intensity therein. That is, each object classifier 74 is designed for a particular range of rain intensity. For example and continuing with the normalized range of 0.1 to 1.0, a first object classifier is designed for rain intensities up to 0.1, a second object classifier is designed for rain intensities from 0.1 to 0.3, a third classifier is designed for rain intensities from 0.3 to 0.5, a fourth classifier is designed for rain intensities from 0.5 to 0.7 and a fifth classifier is designed for rain intensities from 0.7 to 1. A default object classifier is trained with clear visual data, i.e., no rain. It is readily understood that the ranges may be divided into more or less sub-ranges and have different values.

In the example embodiment, the two or more object classifiers 74 are implemented using convolutional neural networks and, more particularly, the object classifiers 74 are implemented using the YOLO algorithm. Other types of object detection algorithms as well as other types of deep neural networks are contemplated by this disclosure. Likewise, it is contemplated that other types of machine learning methods, such as support vector machines or histogram-of-gradient based approaches, can be used in place of deep neural networks. In some embodiments, the object classifiers each have the same architecture; whereas, in other embodiments, the object classifiers for different rain intensities have different architectures.

In real-time, the system 70 can employ the appropriate object classifier depending on the measured level of rain, for example by using the rain sensor 71. In addition to rain intensity, an appropriate object classifier can be selected based on other attributes associated with rain, such as size of drops and/or wind conditions.

Moreover, it is envisioned that the system 70 could be adapted for detecting objects in other types of adverse weather conditions, including but not limited to snow, sleet or sand storms. The rain sensor can be used to detect and/or measure sleet or snow. Additionally, it is readily understood that other types of sensors would be used to detect and/or measure different weather conditions. For example, camera images, video as well as data from radar or LiDAR could be used to detect and/or measure weather conditions, such as fog or snow.

Returning to FIG. 6, the selector 72 is interfaced with the rain sensor 71 and each of the object classifiers 74. During operation, the default object classifier is primarily used to classify objects contained in the image data received from the camera 73. Upon detecting rain, the selector 72 activates one of the other object classifiers 74 to receive the image data from the camera 73 based on input from the rain sensor 71. Specifically, the selector 72 activates the object classifier which corresponds to the level of rain intensity measured by the rain sensor 71. For example, if the measured rain intensity is 0.25, the second object classifier is activated; whereas, if the measured rain intensity is 0.55, the fourth object classifier is activated. The activated object classifier in turn receives the image data and classifies objects contained in the image data.

Figure 7:
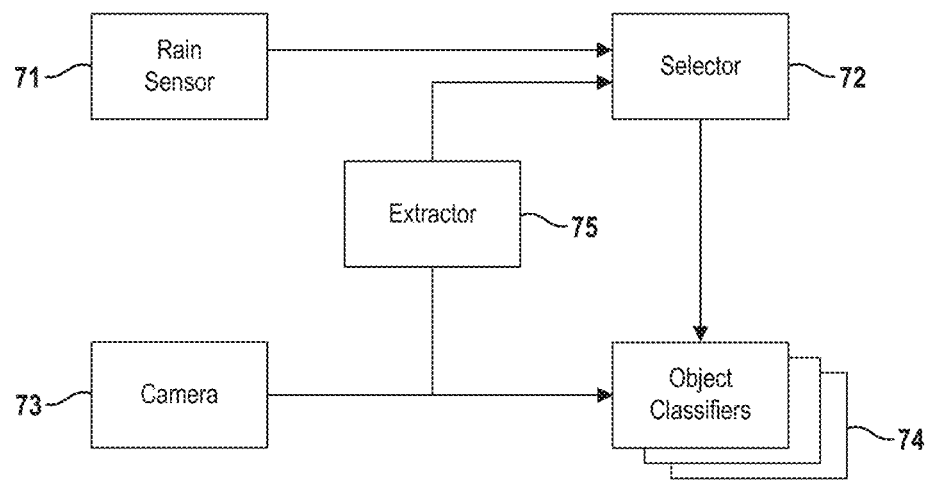
FIG. 7 is a diagram of another example embodiment for a system that detects objects under rainy conditions.

In some embodiments, the system 70 may include an extractor 75 as seen in FIG. 7. The extractor 75 is configured to receive the image data from the camera 73. The extractor 75 is designed to determine level of rain intensity from the image data. In one example embodiment, the extractor 75 determines the level of rain intensity using one of the deraining algorithm described above. Other methods for determining the level of rain intensity from the image data also fall within the scope of this disclosure.

In one embodiment, the selector 72 activates one of the object classifiers based solely on the input from the extractor 75. In another embodiment, the selector 72 activates one of the object classifiers 74 based on input from the rain sensor 71 and the extractor 75. For example, the selector 72 may activate one of the object classifiers using an average of the level of rain intensity received from the extractor and the level of rain intensity measured by the rain sensor.

Figure 8A:
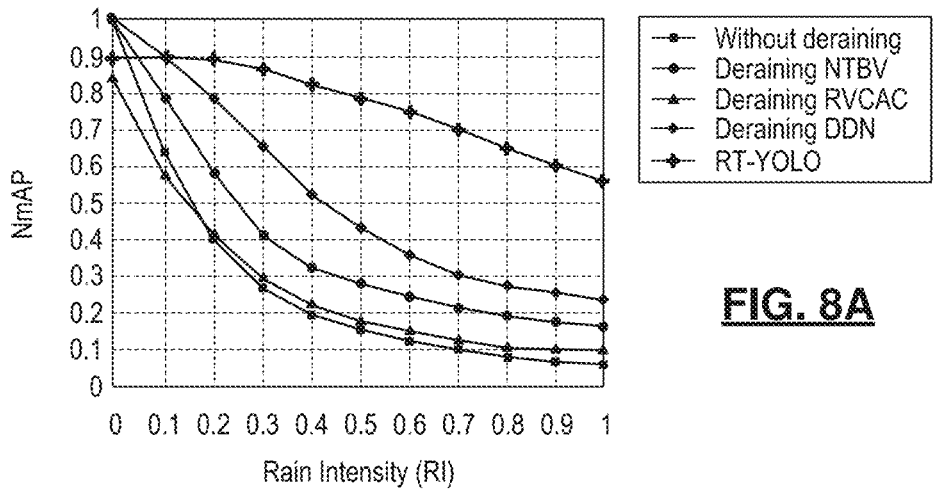
FIG. 8A is a graph showing NmAP for RT-YOLO using synthetic rainy frames with RI=0.3 in comparison with the NmAP for Yolo that is trained using clear frames with and without applying the deraining algorithms.

In any case, this system 70 significantly improves the performance of object detection. In fact, even if one trains a given CNN based on a particular rain intensity, this trained CNN can still provide good detection performance over much wider range of rain intensities when compared to using a CNN trained using clear frames or when using deraining in conjunction with object detection. FIG. 8A shows the performance metric (NmAP) of trained YOLO using synthetic rain frames with RI=0.3; where this performance of the object detection is compared with a trained YOLO using clear frames with and without applying the deraining algorithms. Clearly, there is significant improvement in the detection results for various rain intensities in comparison with the deraining methods that are described above.

Figure 8B:
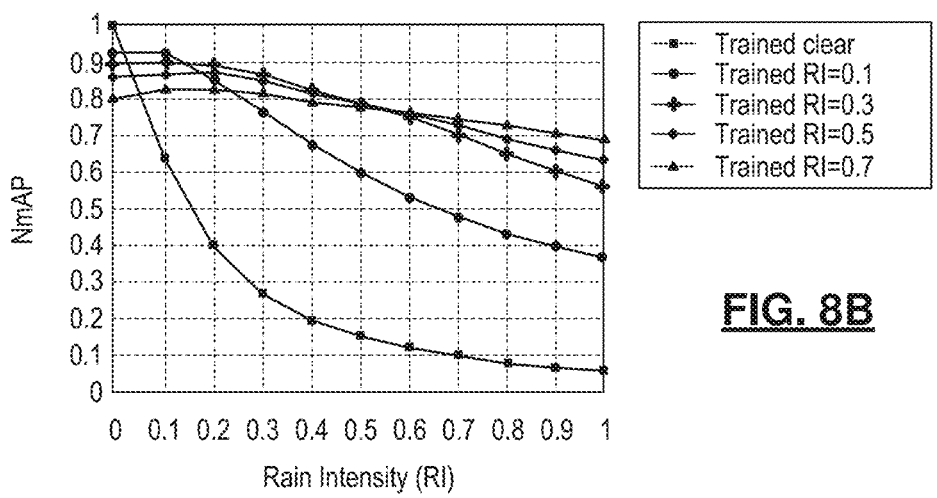
FIG. 8B is a graph showing NmAPs for RT-YOLO using various rain intensities.

To further increase the performance of the system 70 (especially for heavy rain), YOLO was trained using several cases corresponding to different training data. Under each case, visual data that has been corrupted by synthetic rain with a specific rain intensity (RI) is used. FIG. 8B shows the performance metric (NmAP) of YOLO trained using synthetic rain frames with RI=0.1, 0.3, 0.5 and 0.7, as well as YOLO trained with clear frames. From the figure, one can conclude that YOLO trained by low rain intensity frames has good performance under light rain conditions, but its performance declines as rain intensity increases. However, it is still better than YOLO trained with clear frames. On the other hand, YOLO trained by higher rain intensities has significantly better performance under heavier rain. Nevertheless, under light and moderate rain, its performance is slightly lower than the other trained YOLO algorithms.

In the example embodiment, it is important to note that all Rain Trained YOLO object classifiers 74 have the same CNN structure. However, their weights are different. Consequently, one can utilize all trained YOLO in a single unified system to obtain the best performance for various rainy intensities. In other embodiments, object classifiers 74 may have different structures and/or employ different object detection algorithms for different rain intensities. For example, one type of detection algorithm may be more suitable for light rain while another type of detection algorithm is better suited for heavy rain.

Alternatively, the system could employ a single CNN but the CNN could be loaded with the appropriate weights depending on the rain intensity. Table 1 below shows one possible example of such adaptation based on this study.

| Input sensor rain intensity | Selected |
|---|---|
| [0-0.01] | Trained clear |
| [0.02-0.15] | Trained RI = 0.1 |
| [0.16-0.55] | Trained RI = 0.3 |
| [0.56-1] | Trained RI = 0.7 |

Figure 8C:
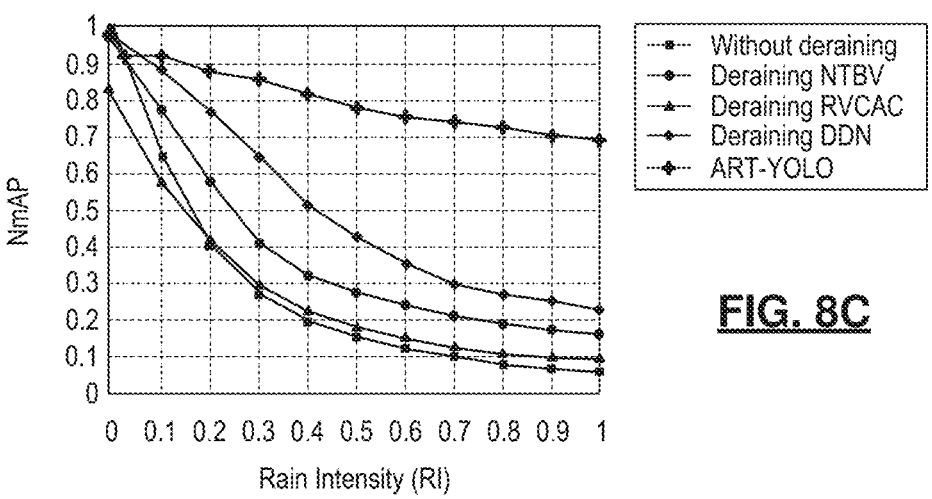
FIG. 8C is a graph showing NmAP of proposed ART-YOLO as compared to state-of-the-art deraining algorithms.

This particular strategy is referred to as Adaptive Rain-Trained YOLO (ART-YOLO). FIG. 8C shows the performance of the proposed ART-YOLO strategy as compared to state-of-the-art deraining algorithms. From the figure, one can observe that ART-YOLO significantly outperforms the deraining methods over the wide range of rain intensities.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for detecting objects in a scene under rainy weather conditions, comprising:
   a camera configured to capture image data of the scene;
   a neural network configured to receive the image data from the camera and operates to classify objects contained in the image data;
   multiple sets of weights for use by the neural network, where data with different levels of rain intensity therein is used to generated the multiple sets of weights
   a rain sensor; and
   a selector interfaced with the rain sensor and the neural network, wherein the selector loads a given set of weights for use by the neural network based on input from the rain sensor, and the given set of weights corresponds to a level of rain intensity measured by the rain sensor.

2. The system of claim 1 wherein the neural network is further defined as a deep neural networks.

3. The system of claim 1 wherein the neural network is further defined as a convolutional neural networks.

4. The system of claim 1 wherein the neural network is implemented using you only look once algorithm.

5. The system of claim 1 further includes an extractor configured to receive the image data from the camera and operates to determine level of rain intensity from the image data, wherein the selector loads the given set of weights based on input from the extractor.

6. The system of claim 5 wherein the extractor determines level of rain intensity from the image data using a deraining algorithm.

7. A method for detecting objects in a scene, comprising:
   capturing, by an imaging device, image data of the scene;
   measuring, by a sensor, an attribute of rain in the scene;
   loading a given set of weights for use by a neural network based on input from the sensor, where the given set of weights corresponds to a level of rain intensity measured by the sensor and is chosen from different sets of weights accessible by the neural network;
   and
   classifying objects contained in the image data using the neural network.

8. The method of claim 7 wherein the neural network is further defined as a convolutional neural networks.

9. The method of claim 7 further comprises determining a level of rain intensity from the image data, and loading the given set of weights based in part on the level of rain intensity determined from the image data.

10. The method of claim 9 further comprises determining the level of rain intensity from the image data using a deraining algorithm.

* * * * *